United States Patent [19]
Kinouchi et al.

[11] Patent Number: 5,785,474
[45] Date of Patent: Jul. 28, 1998

[54] APPARATUS FOR FIXING VEHICLE CARRYING PLATFORMS

[75] Inventors: Toyohisa Kinouchi; Noriyuki Okutsu; Seiji Nomoto, all of Tokyo, Japan

[73] Assignee: Car Mate Mfg. Co., Ltd., Tokyo, Japan

[21] Appl. No.: 589,052

[22] Filed: Jan. 19, 1996

[30] Foreign Application Priority Data

Jan. 20, 1995 [JP] Japan ................................. 7-024603

[51] Int. Cl.$^6$ ........................................... B60R 9/00
[52] U.S. Cl. ........................ 410/96; 224/329; 224/331
[58] Field of Search ............................ 224/322, 325, 224/326, 329, 331; 410/116, 96

[56] References Cited

U.S. PATENT DOCUMENTS

| | | | |
|---|---|---|---|
| 4,688,706 | 8/1987 | Thulin | 224/329 |
| 4,877,169 | 10/1989 | Grim | 224/331 |
| 5,104,020 | 4/1992 | Arvidsson et al. | 224/329 |
| 5,366,128 | 11/1994 | Grim | 224/329 |

FOREIGN PATENT DOCUMENTS

| | | |
|---|---|---|
| 0527708A1 | 2/1993 | European Pat. Off. . |
| 0543146A1 | 5/1993 | European Pat. Off. . |

*Primary Examiner*—David A. Bucci
*Assistant Examiner*—Gregory A. Morse
*Attorney, Agent, or Firm*—Koda & Androlia

[57] ABSTRACT

An apparatus for mounting a carrying platform to a vehicle in which a carrier bar is grasped and pressed by a pressing section against a stay which is connected to the vehicle, with this pressure applied by a hook latched to the vehicle via a hook-holding member; and when the pressing section is shifted by a load applied to the carrier bar, the hook-holding member is also shifted so as to increase the tightening force of the hook; thus preventing the hook from being loosened by the astride phenomenon which would occur when a load is applied to the carrier bar.

11 Claims, 13 Drawing Sheets

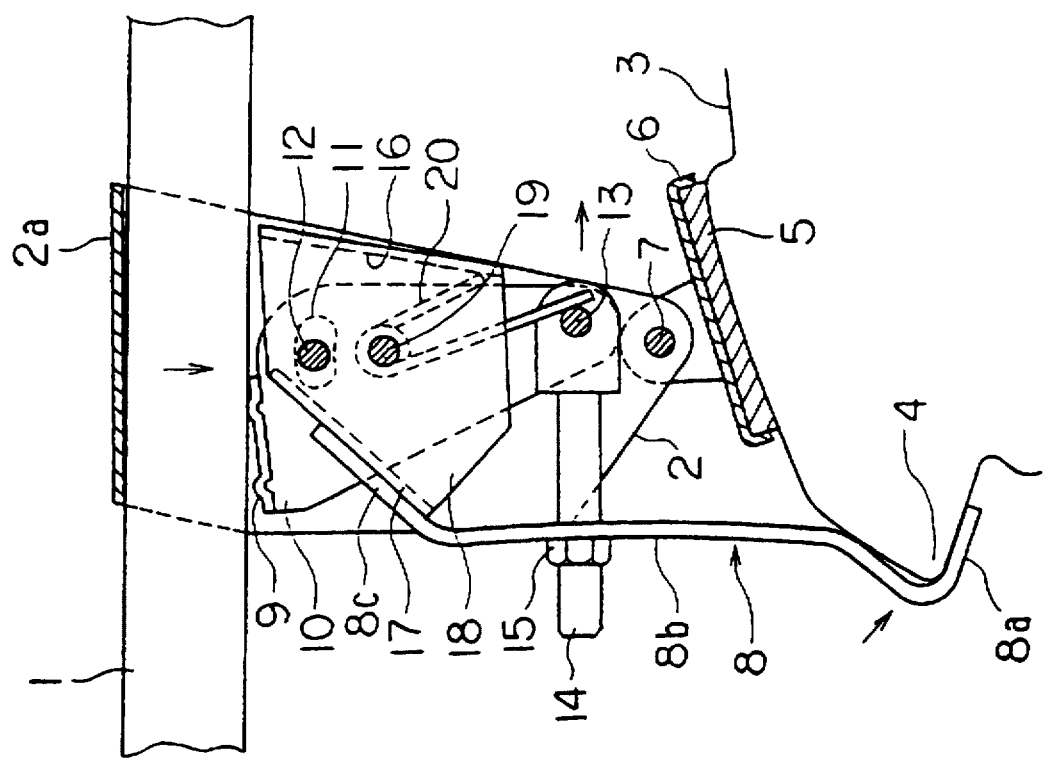
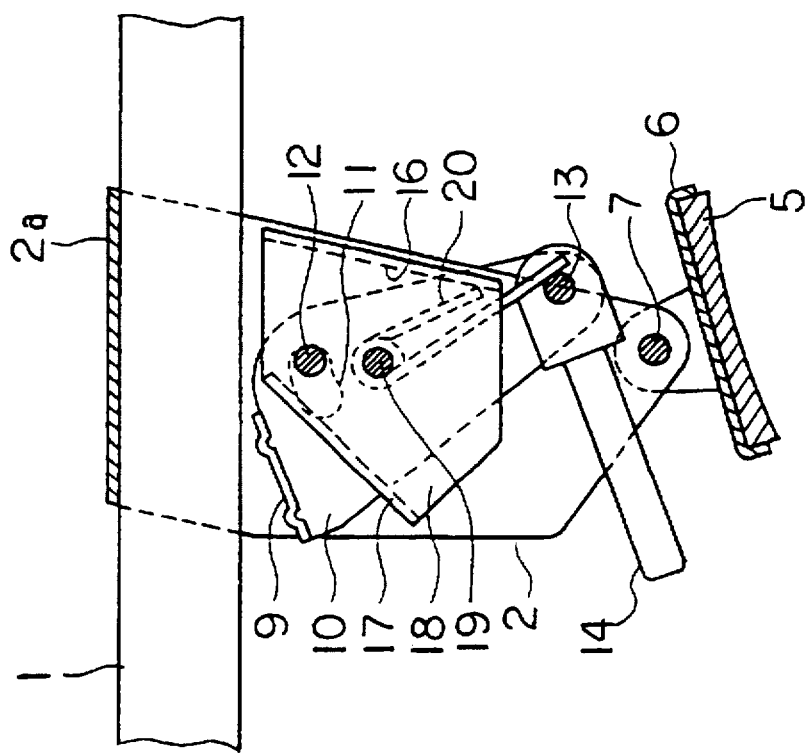

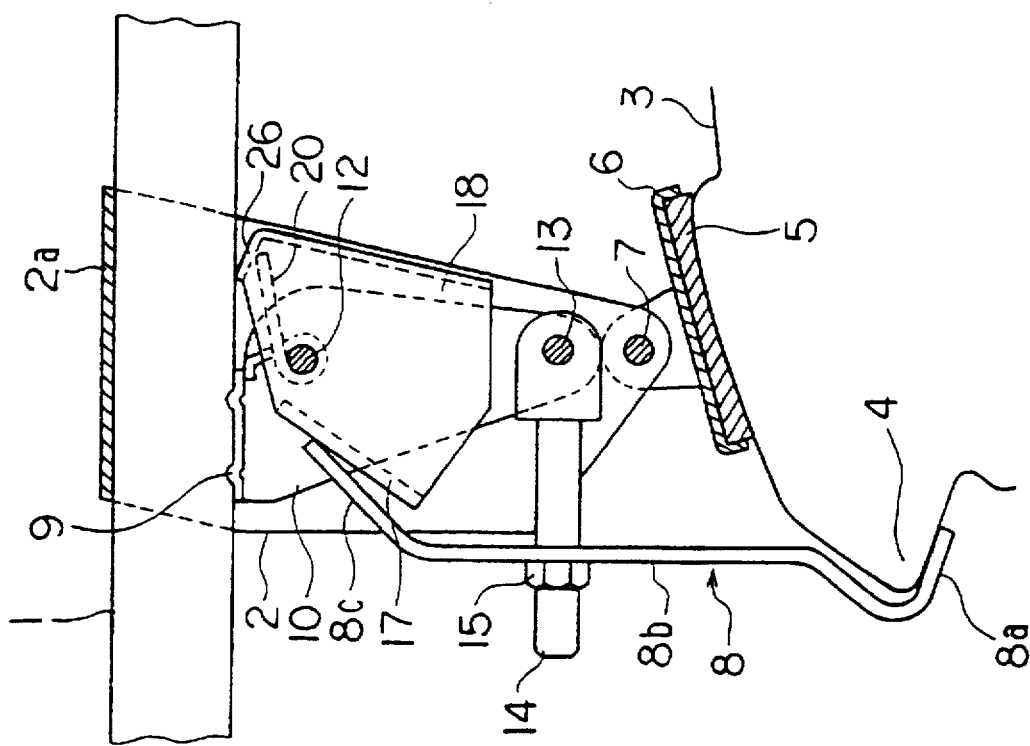
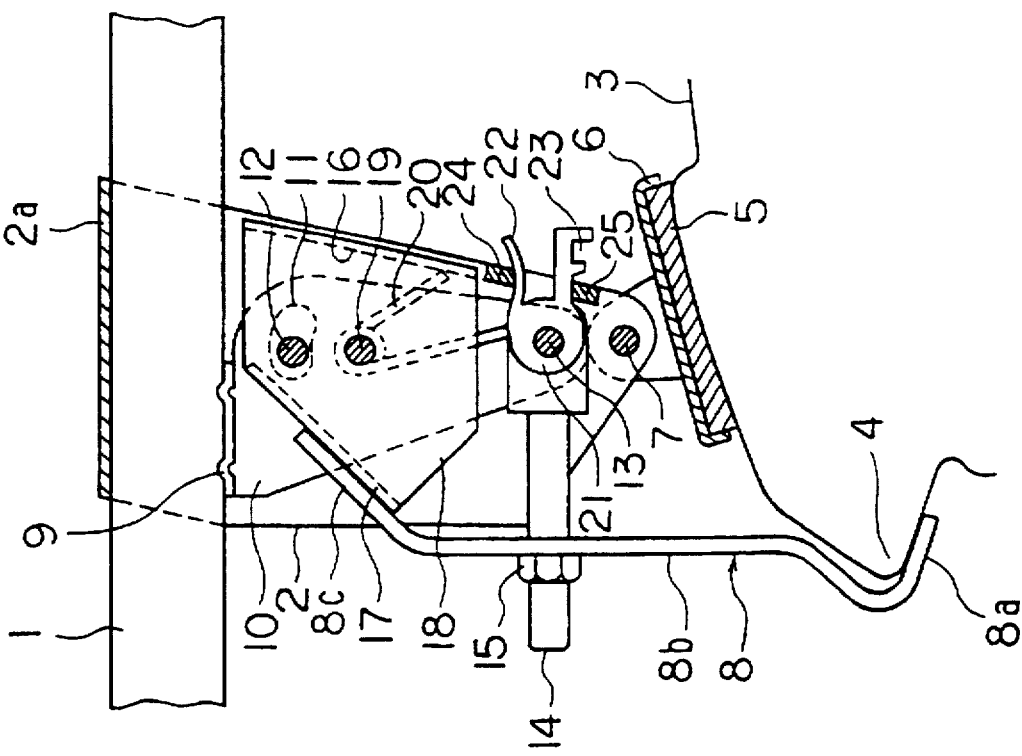

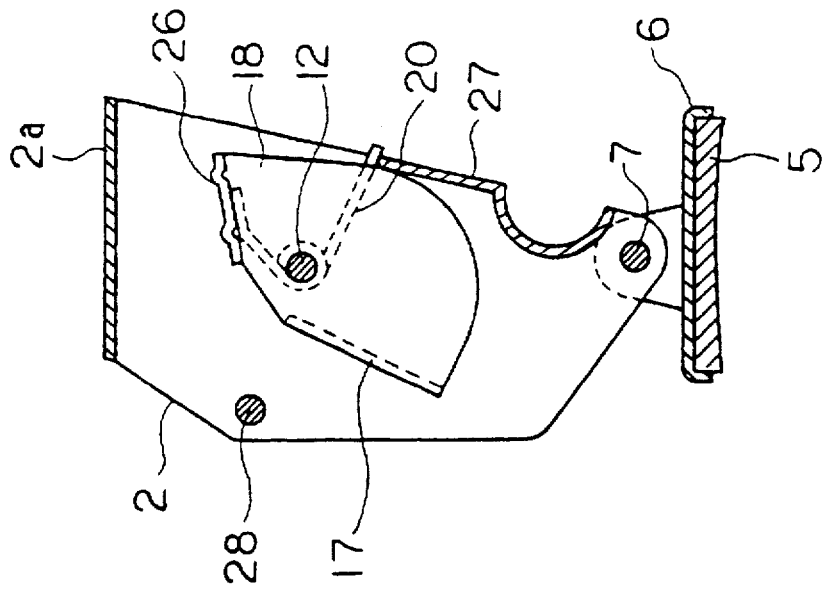
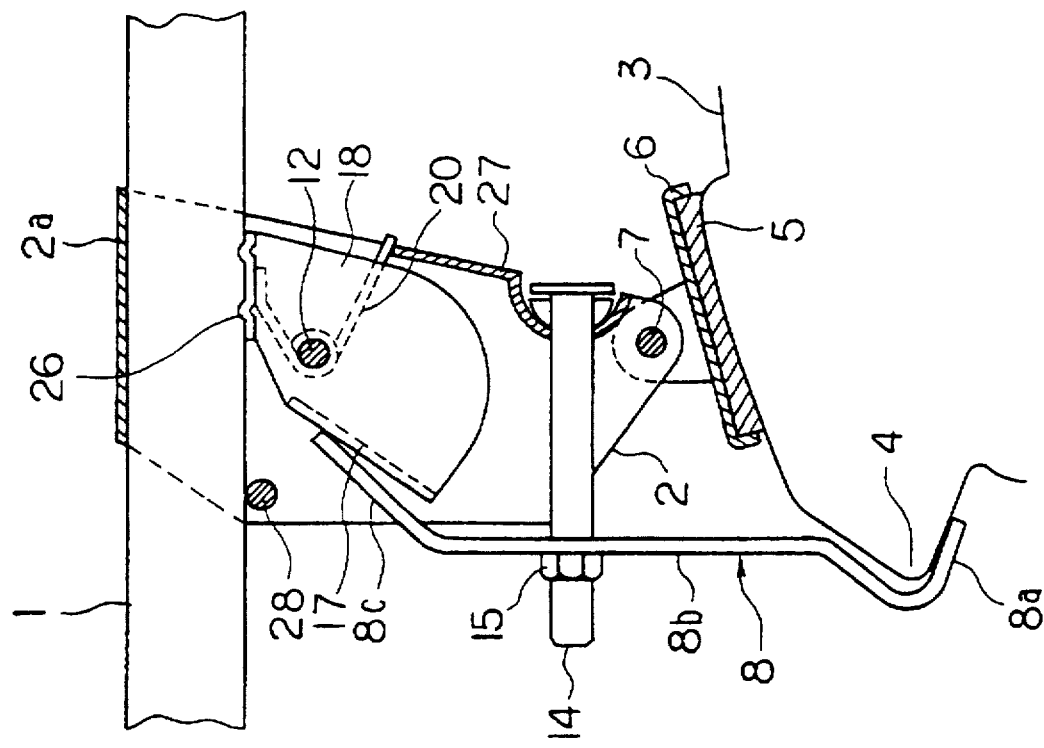

and an elastic means inserted
between the hook-holding member and the pressing plate.

APPARATUS FOR FIXING VEHICLE CARRYING PLATFORMS

BACKGROUND OF THE INVENTION

1. Field of the Invention

The present invention relates to an apparatus for fixing a vehicle carrying platform, and in particular, to a vehicle carrying platform fixing apparatus that can prevent the hook from being loosened.

2. Description of the Related Art

Conventional apparatuses for fixing a vehicle carrying platform include those described in Japanese Utility Model Laid Open No. 60-106854, Japanese Utility Model Laid Open No. 64-1140, and Japanese Utility Model Laid Open No. 62-68154.

The apparatuses described in Japanese Utility Model Laid Open No. 60-106854 and Japanese Utility Model Laid Open No. 64-1140 require a hook and a stay to be tightened together, resulting in an operation that requires much time and labor. In addition, when a load is applied to the carrier bar, the carrier bar bends to open the hook outward (the astride phenomenon), thereby loosening the tightened sections. These apparatuses include no mechanism to prevent such loosening.

The apparatus described in Japanese Patent Laid Open No. 62-68154 can simultaneously fix a hook to the stay and the stay to the carrier, but has no mechanism to prevent the tightened sections from loosening.

In the apparatuses described in Japanese Patent Laid Open No. 62-68154 and shown in FIG. 8, during the astride phenomenon, the tightened sections move inward, while the upper part (the slide surface) of the hook simultaneously moves inward and downward relative to the rotating shaft. In other words the lower part of the hook rotates outward, whereas its upper part rotates inward. As a result, the hook cannot prevent loosening. A roof-side pressing section below the hook also opens outward of the surface of a roof side and is likely to be removed from the roof side.

SUMMARY OF THE INVENTION

The purpose of this invention is to eliminate these problems.

An apparatus for fixing a vehicle carrying platform according to this invention comprises a stay and pressing section connected to a vehicle for grasping a carrier bar, a hook hooked to the vehicle for pressing the pressing section against the carrier bar, and a hook-holding member, wherein when the pressing section is shifted in the direction in which the tightening is loosened, the tightening force of the hook is increased by the hook-holding member.

An apparatus for fixing a vehicle carrying platform according to this invention comprises a stay having in its upper part a surface that engages the upper surface of a carrier bar and the lower part of which is attached to the vehicle; a hook the lower part of which is hooked to the vehicle; a pressing plate having on its upper surface a pressing section that engages the lower surface of the carrier bar, the upper part of which is connected to the intermediate portion of the stay via a pin and the lower part of which is connected to the intermediate portion of the hook via a tightening member; a hook-holding member having a free-sliding slide section that engages the upper part of the hook, the upper part of which connects to the intermediate portion of the stay via the pin and the intermediate portion of which is rotatably connected to the intermediate portion of the pressing plate via a pivotal pin; and an elastic means inserted between the hook-holding member and the pressing plate.

The elastic means comprises a spring wound around the pivotal pin to rotatably connect the hook-holding member to the intermediate portion of the pressing plate, one end of which contacts the hook-holding member and the other end of which contacts the lower part of the pressing plate.

An apparatus for fixing a vehicle carrying platform according to this invention comprises a stay having in its upper part a surface that engages the upper surface of a carrier bar and the lower part of which is attached to the vehicle; a pressing plate having on its hook-side upper surface a pressing section that engages the lower surface of the carrier bar, the upper part of which is rotatably connected to the intermediate portion of the stay via a pivotal pin, and the lower part of which is connected to the intermediate portion of the hook via a tightening member; a hook-holding member having on the hook side a slide section that engages the upper part of the hook and connects to the intermediate portion of the hook and the upper part of the pressing plate via the pivotal pin; and an elastic means inserted between the hook-holding member and the pressing plate.

The hook-holding member has a pressing section on its upper surface opposite the hook, and the elastic means comprises a spring wound around the pivotal pin to rotatably connect the hook-holding member to the intermediate portion of the pressing plate, one end of which contacts the pressing section of the pressing plate.

An apparatus for fixing a vehicle carrying platform according to this invention has a self-locking member to lock the lower part of the pressing plate to the stay.

An apparatus for fixing a vehicle carrying platform according to this invention comprises a stay having in its upper part a surface that engages the upper surface of a carrier bar and the lower part of which is attached to the vehicle; a hook the lower part of which is hooked to the vehicle while the intermediate portion is connected to the lower portion of the stay via a tightening member; a hook-holding member having on its upper surface opposite the hook a pressing section that engages the lower surface of the carrier bar, having on the hook side a free-sliding slide section that engages the upper part of the hook, and rotatably connects to the intermediate portion of the stay via a pivotal pin; and an elastic means inserted between the hook-holding member and the pressing plate.

The elastic means comprises a spring wound around the pivotal pin to rotatably connect the hook-holding member to the stay, one end of which contacts the opposite side of the hook of the stay while the other end contacts the pressing section of the hook-holding means.

An apparatus for fixing a vehicle carrying platform according to this invention comprises a stay having in its upper part a surface that engages the upper surface of a carrier bar and the lower part of which is attached to the vehicle; a hook the lower part of which is hooked to the vehicle, while the intermediate portion is connected to the lower portion of the stay via a tightening member; a hook-holding member having on its upper surface opposite the hook a pressing section that engages the lower surface of the carrier bar, having on the hook side a free-sliding slide section that engages the upper part of the hook, and rotatably connects to the upper part of the stay via a pivotal pin; and a means provided below the hook-holding member to hold the tightening member.

An apparatus for fixing a vehicle carrying platform according to this invention comprises a stay having in its upper part a surface that engages the upper surface of a carrier bar and the lower part of which is attached to the vehicle; a hook the lower part of which is hooked to the vehicle; a pressing plate having on its upper surface a pressing section that engages the lower surface of the carrier bar and rotatably connects to the intermediate portion of the stay via a pin; a hook-holding member having a free-sliding slide section that engages the upper part of the hook, the upper part of which rotatably connects to the pressing plate via a pivotal pin and the lower part of which is connected to the intermediate portion of the hook via a tightening member.

An apparatus for fixing a vehicle carrying platform according to this invention comprises a stay having in its upper part a pressing section that engages the lower surface of a carrier bar and the lower part of which is attached to the vehicle; a hook the lower part of which is hooked to the vehicle; a pressing plate having on its upper surface a surface that engages the upper surface of the carrier bar, a pressing plate the lower part of which is connected to the upper part of the stay via a pin; a hook-holding member having in its upper part a free-sliding slide section that engages the upper part of the hook, the upper part of which is connected to the lower part of the pressing plate and the upper part of the stay via the pin and pivotal pin, respectively, while the lower part connects to the intermediate portion of the hook via a tightening member.

BRIEF DESCRIPTION OF THE DRAWINGS

FIG. 6 is a vertical cross-sectional front view of the apparatus for fixing a vehicle carrying platform according to this invention before an operation;

FIG. 7 is a vertical cross-sectional front view of the apparatus for fixing a vehicle carrying platform according to this invention during an operation;

FIG. 8 is a vertical cross-sectional front view of the apparatus for fixing a vehicle carrying platform according to the second embodiment of this invention;

FIG. 9 is a vertical cross-sectional front view of the apparatus for fixing a vehicle carrying platform according to the third embodiment of this invention;

FIG. 12 is a vertical cross-sectional front view of the apparatus for fixing a vehicle carrying platform according to the fourth embodiment of this invention;

FIG. 13 is a vertical cross-sectional front view of the fourth embodiment the apparatus for fixing a vehicle carrying platform according to this invention before an operation;

DETAILED DESCRIPTION OF THE PREFERRED EMBODIMENTS

Figure 1:
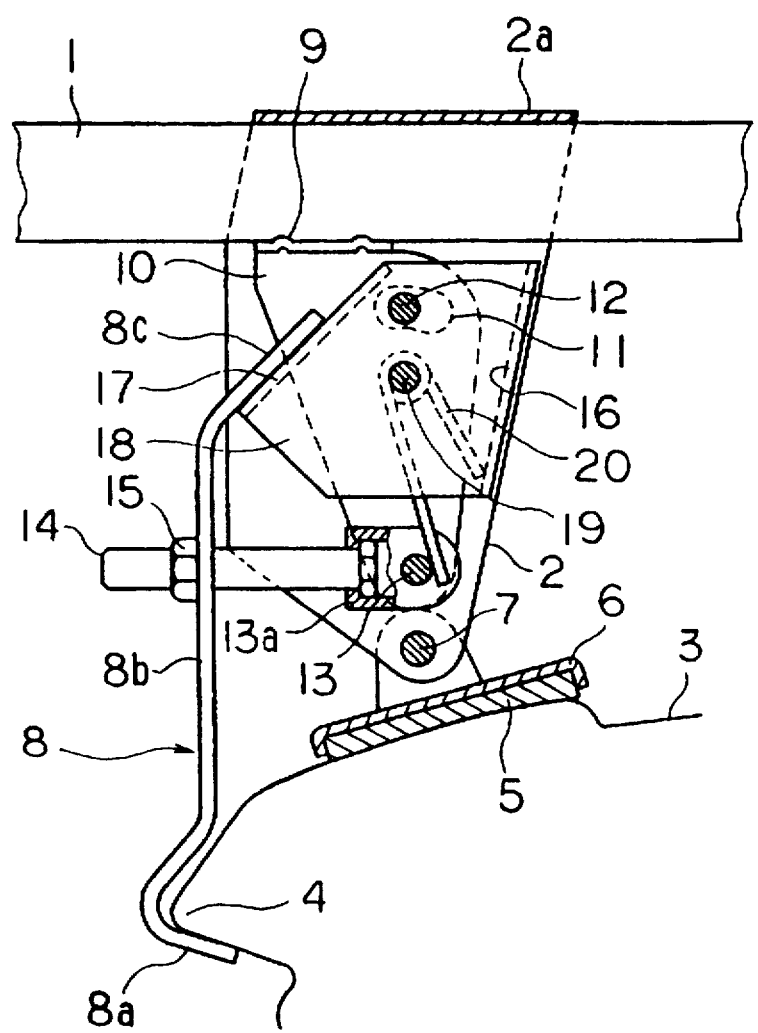
FIG. 1 is a vertical cross-sectional front view of an apparatus for fixing a vehicle carrying platform according to this invention.
Figure 2:
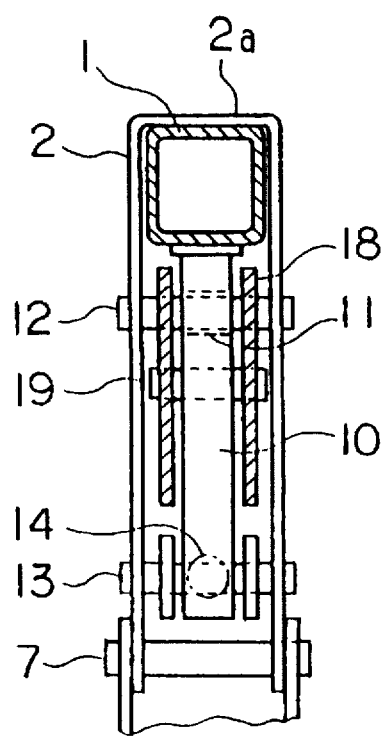
FIG. 2 is a vertical cross-sectional side view of the apparatus for fixing a vehicle carrying platform according to this invention.
Figure 4:
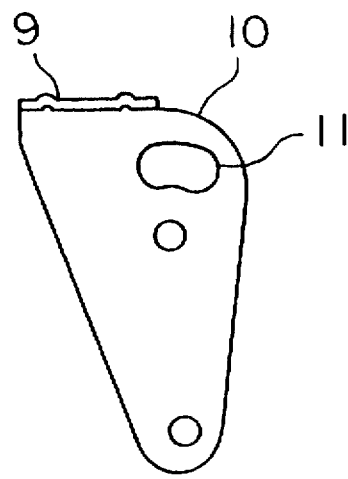
FIG. 4 is a front view of a pressing plate in the apparatus for fixing a vehicle carrying platform according to this invention.
Figure 3:
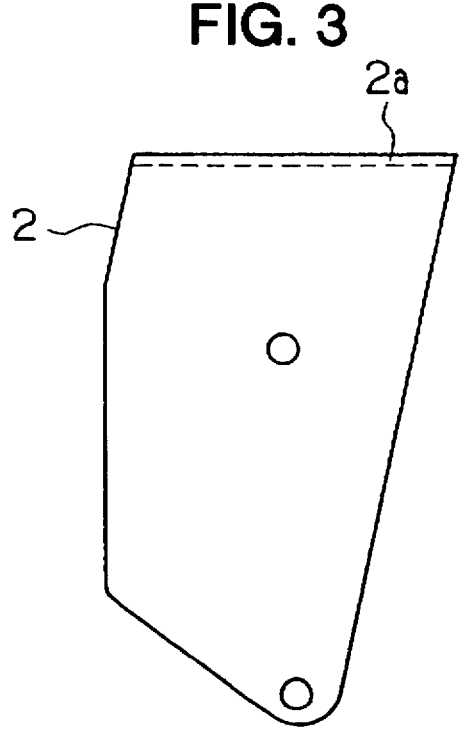
FIG. 3 is a front view of a stay in the apparatus for fixing a vehicle carrying platform according to this invention.
Figure 5:
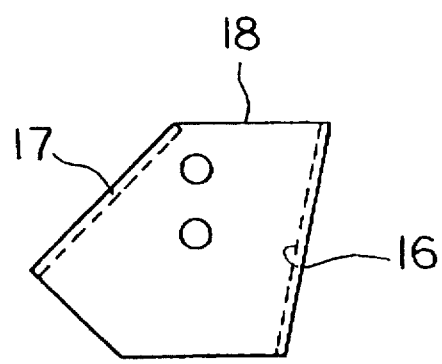
FIG. 5 is a front view of a hook-holding member in the apparatus for fixing a vehicle carrying platform according to this invention.

An embodiment of this invention is described with reference to the drawings.

In FIGS. 1 to 7, reference numeral 1 designates a carrier bar; 2 is a "⊐" shaped stay having an upper part 2a contacting the upper surface of a carrier bar 1 when it is inserted; 3 is a roof of a vehicle, 4 is a corner of the roof; 5 is a cushion fixed to the roof 3; 6 is a stay base mounted on the cushion 5; 7 is a pivotal pin for pivotally fixing the lower part of the stay 2 to the stay base 6; and 8 is a hook for hooking a lower bent part 8a to the corner 4 of the roof 3.

In a first embodiment of this invention, a pressing section 9 that contacts the lower surface of the carrier bar 1 is provided on the outer (the hook 8 side) upper surface of the pressing plate 10, the inner (the opposite side of the hook 8) upper part of the pressing plate 10 is connected to the intermediate portion of the stay 2 via an arc-like long hole 11 with its center at the lower pivotal point, while the lower part of the pressing plate 10 and the intermediate portion 8b of the hook 8 are connected via a pivotal pin 13, a mounting member 13a rotatably connects to the pivotal pin 13, a bolt 14, the head of which is fixed to the mounting member 13a, and a tightening member comprising a nut 15 that spirally connected to the bolt 14 outside the hook 8.

The upper part of a hook-holding member 18 disposed so as to grasp the pressing plate 10 within the "⊐"-shaped stay 2 and having a vertical-end plate 16 and an inclined slide section 17 is connected to the intermediate section of the stay 2 via the pin 12, and its intermediate portion is rotatably connected to the intermediate portion of the pressing plate 10 via a pivotal pin 19. A spring 20 is wound around the pivotal pin 19 with one end contacting the vertical end plate 16 of the hook holding member 18 and the other end contacting the pivotal pin 13 between the bolt 14 and the pressing plate 10.

An upper inclined part 8c is formed in the upper part of the hook 8 and slidably engages with the inclined slide section 17 of the hook-holding member 18.

The apparatus for fixing a vehicle carrying platform has the above configuration. Consequently, when the lower bent part 8a of the hook 8 locks on the corner 4 of the roof 3, and the intermediate portion 8b of the hook 8 is attached to the pressing plate 10 via a pivotal pin 13, a bolt 14, and a nut 15 and tightened, the carrier bar 1 is tightened and fixed firmly by the stay 2 and the pressing plate 9 of the pressing plate 10.

Under these conditions, if a load is applied to the carrier bar 1, causing the carrier bar 1 to be bent as shown in FIG. 7, downward force is applied to the pressing section 9 of the pressing plate 10. As a result, the pressing plate 10 rotates counterclockwise relative to the stay 2 against the force of the spring 20, and the hook 8 is pressed horizontally toward the right as shown by the arrow via a pivotal pin 13 and a bolt 14. Since, however, the hook-holding member 18 rotates clockwise around the pivotal pin 12 against the spring 20, and the upper inclined part 8c of the hook 8 rotates counterclockwise around the bolt 14 via the inclined slide section 17 of the hook-holding member 18, the lower bent part 8a of the hook 8 is pressed firmly against the corner 4 of the roof 3 of the vehicle as shown by the arrow in FIG. 7. The loosening of the hook 8 caused by the astride phenomenon, which has not yet been solved by conventional techniques, is thus completely prevented.

In a second embodiment of this invention, a self-locking member 21 is rotatably attached to the pivotal pin 13 to pivotally fix the bolt 14 to the lower part of the pressing plate 10 as shown in FIG. 8, a spring-like lever 22 and a toothed section 23 that extend in parallel in the direction opposite to the hook 8 are provided on the self-locking member 21, and a protrusion 24 and a stage 25 engaging the lever and the toothed section, respectively, are formed in the corresponding positions of the stay 2.

According to this embodiment, if the nut 15 is loosened, the pressing plate 10 does not rotate because the toothed section 23 engages the stage 25, thereby preventing the loosening of the carrier bar 1 fixed by the stay 2 and the pressing plate 10.

The engagement between the toothed section 23 and the stage 25 can be released easily by picking the spring-like lever 22 and the toothed section 23 in such a way that they approach each other.

Figure 11:
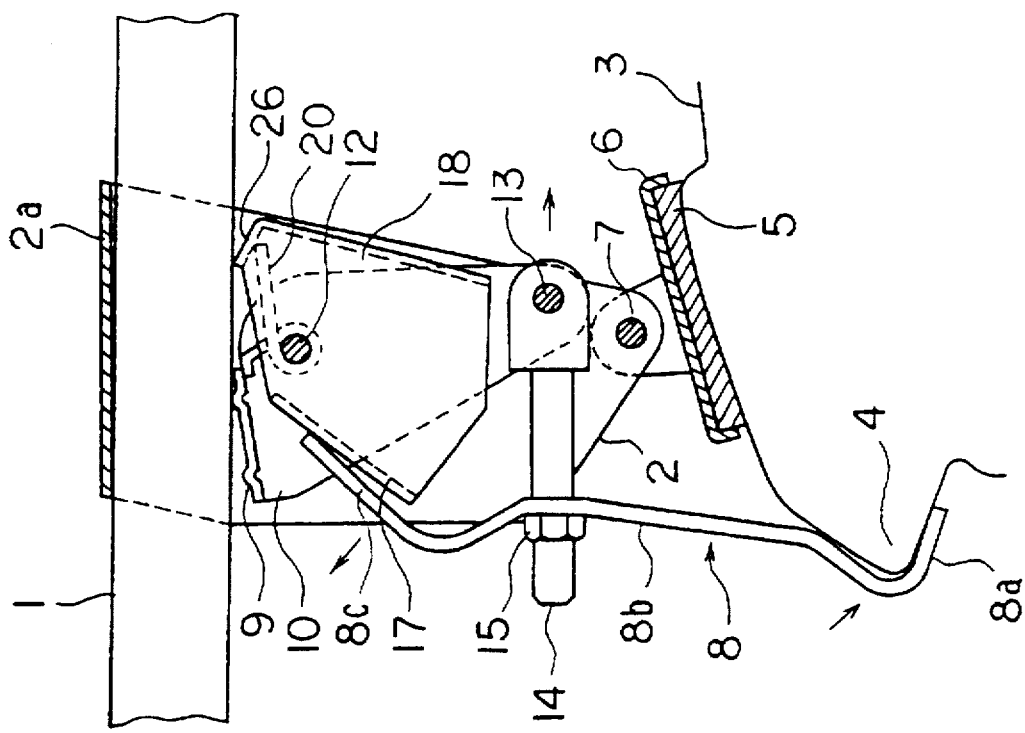
FIG. 11 is a vertical cross-sectional front view of the third embodiment of the apparatus for fixing a vehicle carrying platform according to this invention during an operation.
Figure 10:
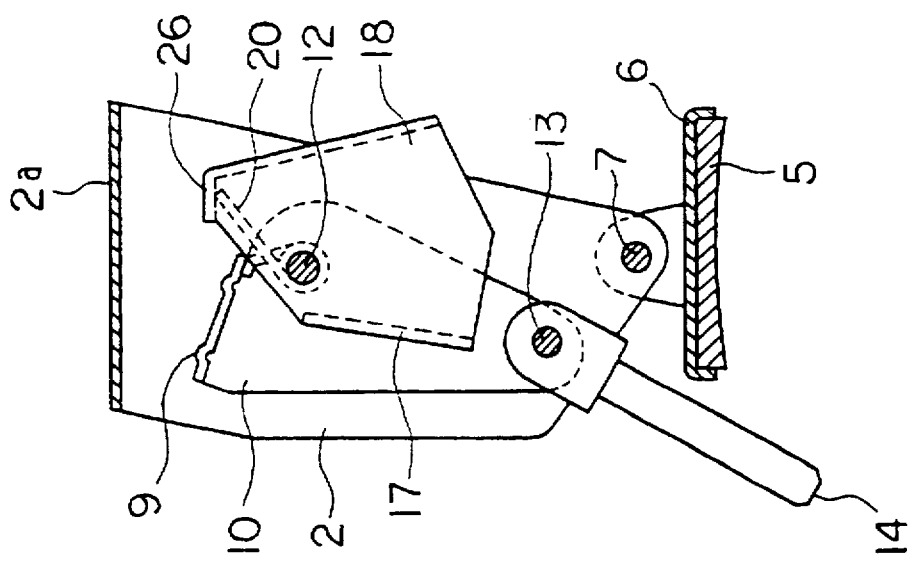
FIG. 10 is a vertical cross-sectional front view of the third embodiment the apparatus for fixing a vehicle carrying platform according to this invention before an operation.

FIGS. 9 to 11 show a third embodiment of this invention. In this embodiment, without the use of the pivotal pin 19 to rotatably connect the intermediate portion of the pressing plate 10 and the intermediate portion of the hook-holding member 18 together, the inner upper surface of the hook-holding member 18 is folded to form a pressing section 26, the spring 20 in the first and second embodiments is wound around the pin 12 to rotatably connect the intermediate portion of the stay 2 to the upper part of the pressing plate 10 and the hook-holding member 18, the spring 20 having one end contracting the lower surface of the pressing section 26 of the hook-holding member 18.

This embodiment performs the same operation and has the same advantages as the first and second embodiments.

Figure 14:
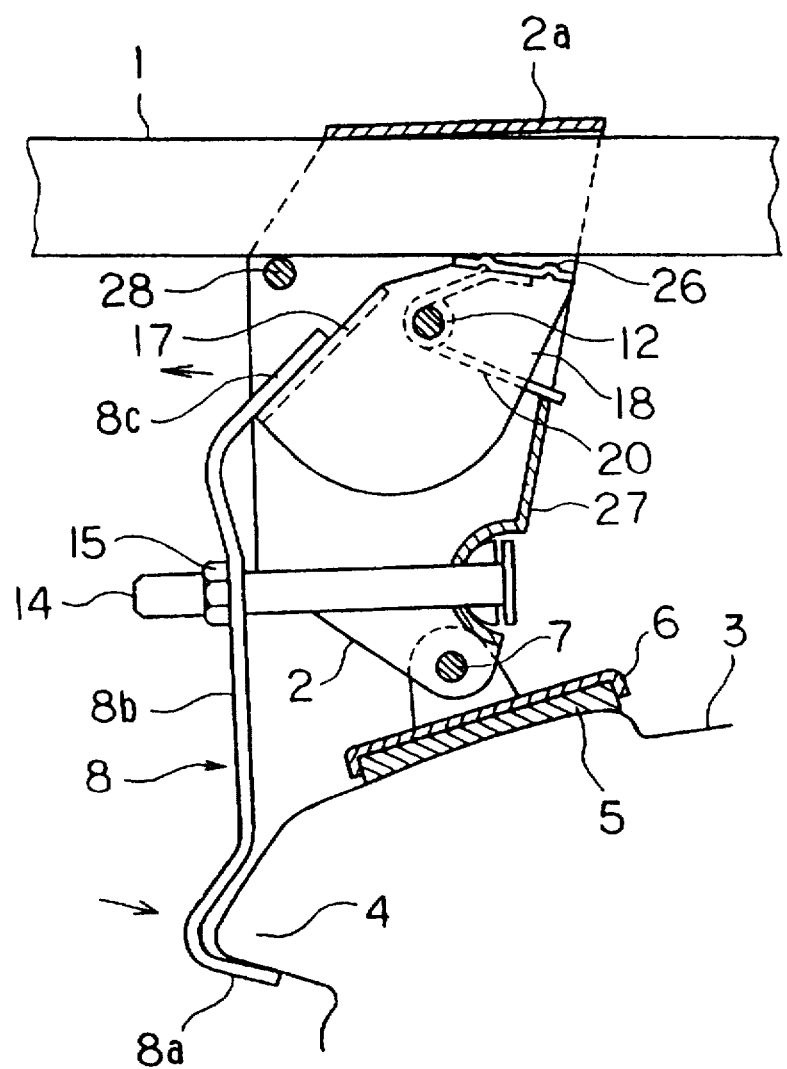
FIG. 14 is a vertical cross-sectional front view of the fourth embodiment of the apparatus for fixing a vehicle carrying platform according to this invention during an operation.

FIGS. 12 to 14 show a fourth embodiment of this invention. In this embodiment, without the use of the pressing plate 10, as in the third embodiment, the base of the bolt 14 is capable of inclining freely and is connected to a rib 27 provided on the inner lower part of the stay 2. One end of the spring 20 is allowed to contact the rib 27 provided on the inner lower part of the stay 2, and a locking pin 28 that contacts the lower surface of the carrier bar 1 is formed so that it protrudes from the outer middle of the stay 2.

The fourth embodiment performs the same operation and has the same advantages as the above embodiments.

Figure 15:
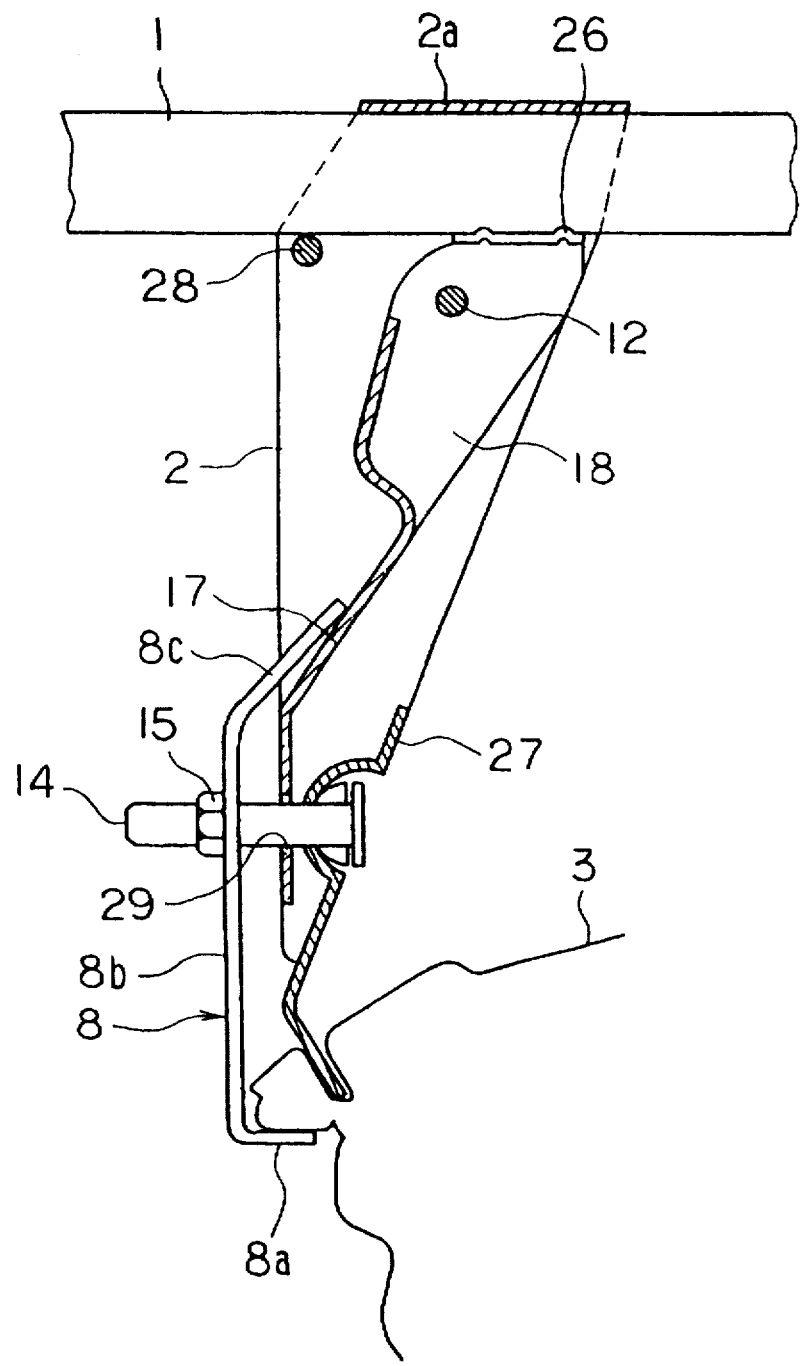
FIG. 15 is a vertical cross-sectional front view of the apparatus for fixing a vehicle carrying platform according to the fifth embodiment of this invention.
Figure 17:
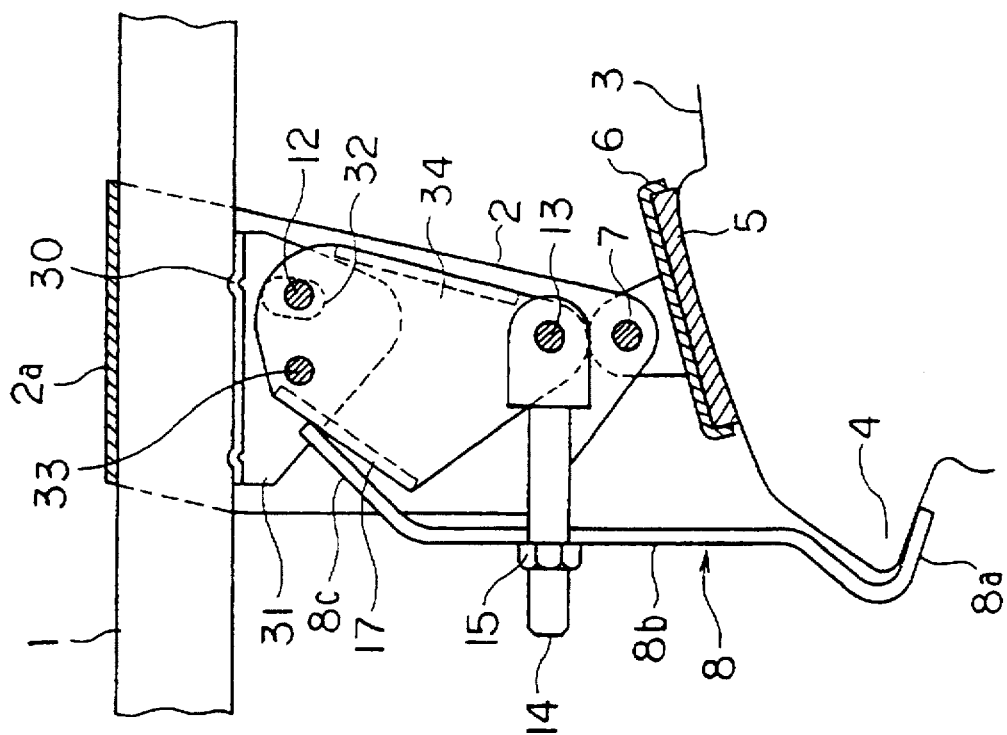
FIG. 17 is a vertical cross-sectional front view of the apparatus for fixing a vehicle carrying platform according to the sixth embodiment of this invention.
Figure 16:
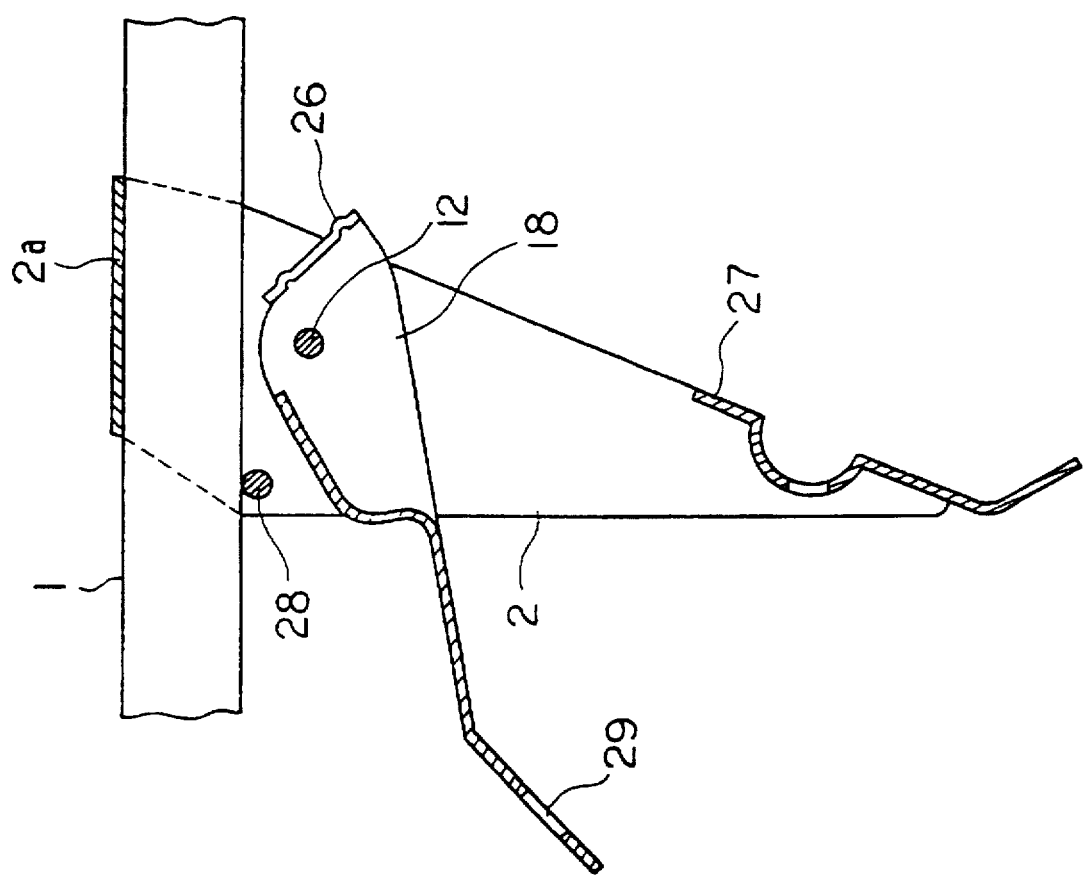
FIG. 16 is a vertical cross-sectional front view of the fifth embodiment the apparatus for fixing a vehicle carrying platform according to this invention before an operation.
Figure 18:
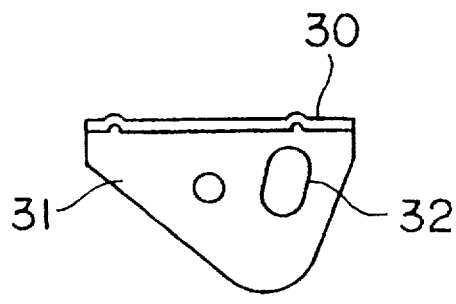
FIG. 18 is a front view of the pressing plate in the apparatus for fixing a vehicle carrying platform according to the sixth embodiment of this invention.
Figure 19:
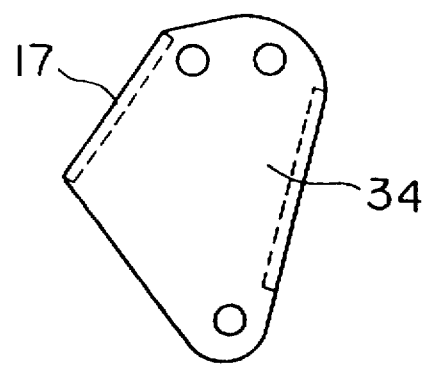
FIG. 19 is a front view of the hook-holding member in the apparatus for fixing a vehicle carrying platform according to the sixth embodiment of this invention.
Figure 20:
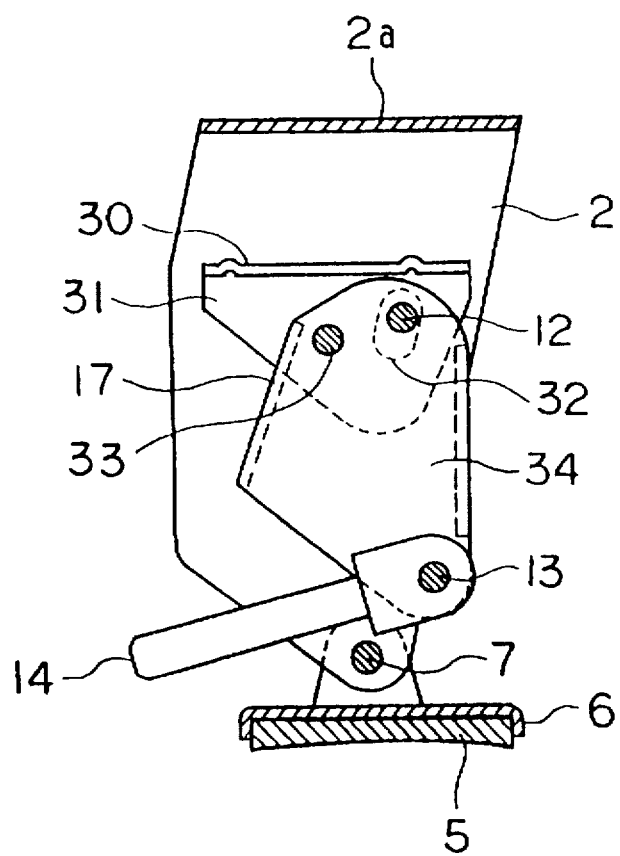
FIG. 20 is a vertical cross-sectional front view of the sixth embodiment the apparatus for fixing a vehicle carrying platform according to this invention before an operation.
Figure 21:
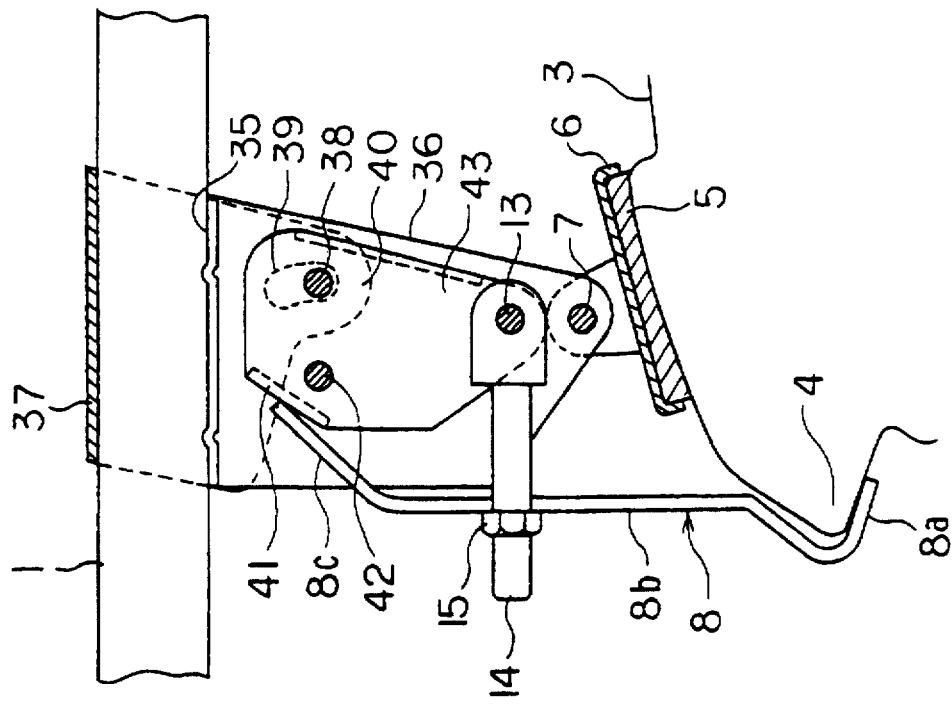
FIG. 21 is a vertical cross-sectional front view of the sixth embodiment of the apparatus for fixing a vehicle carrying platform according to this invention during an operation.
Figure 22:
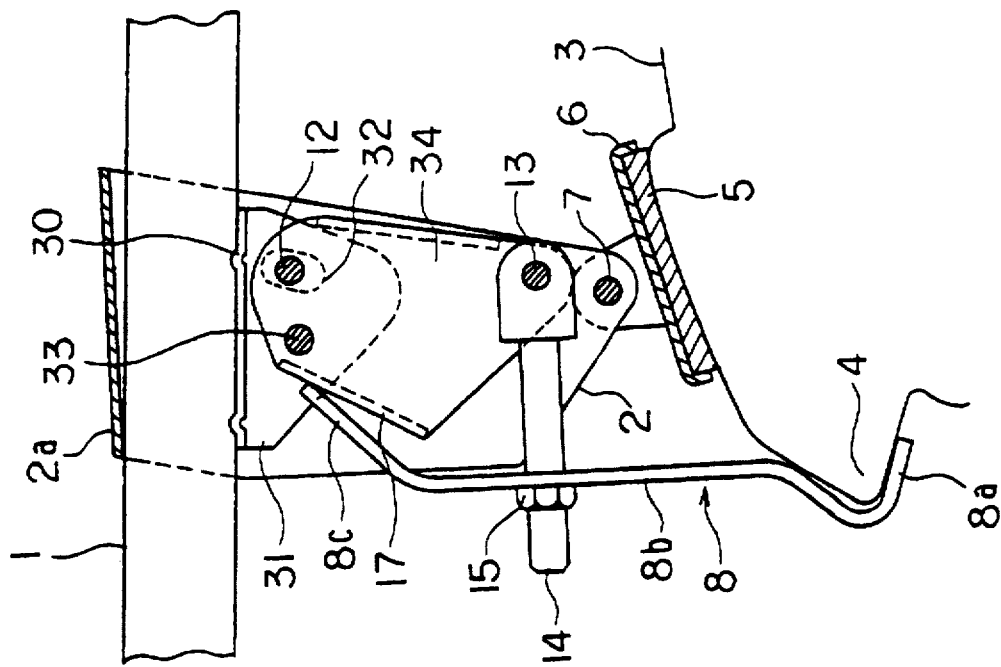
FIG. 22 is a vertical cross-sectional front view of the apparatus for fixing a vehicle carrying platform according to the seventh embodiment of this invention.
Figure 23:
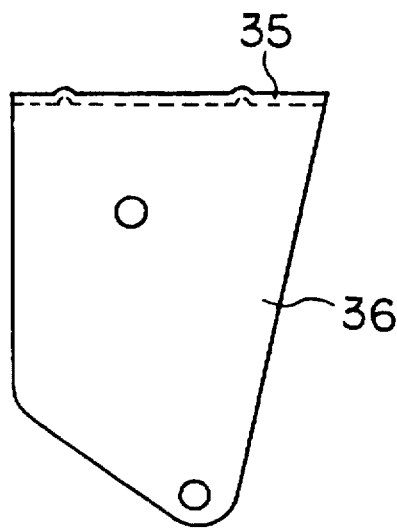
FIG. 23 is a front view of the stay in the apparatus for fixing a vehicle carrying platform according to the seventh embodiment of this invention.
Figure 25:
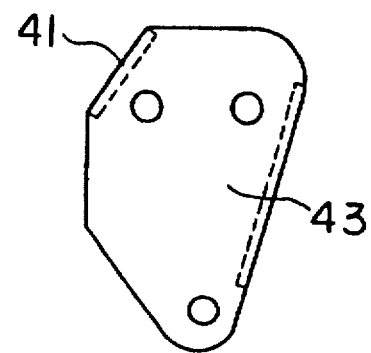
FIG. 25 is a front view of the book-holding member in the apparatus for fixing a vehicle carrying platform according to the seventh embodiment of this invention.
Figure 24:
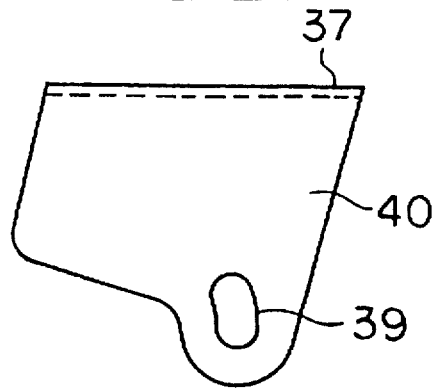
FIG. 24 is a front view of the pressing plate in the apparatus for fixing a vehicle carrying platform according to the seventh embodiment of this invention
Figure 26:
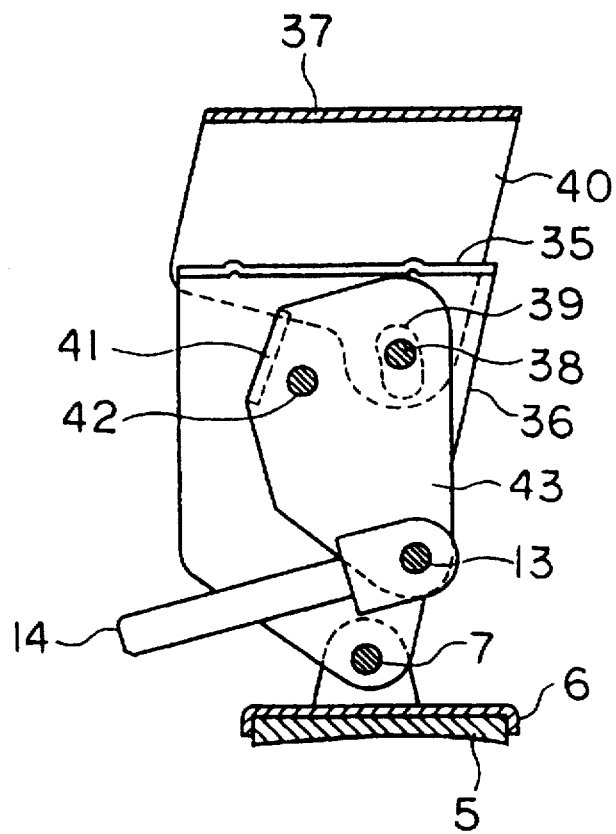
FIG. 26 is a vertical cross-sectional front view of the seventh embodiment the apparatus for fixing a vehicle carrying platform according to this invention before an operation.
Figure 27:
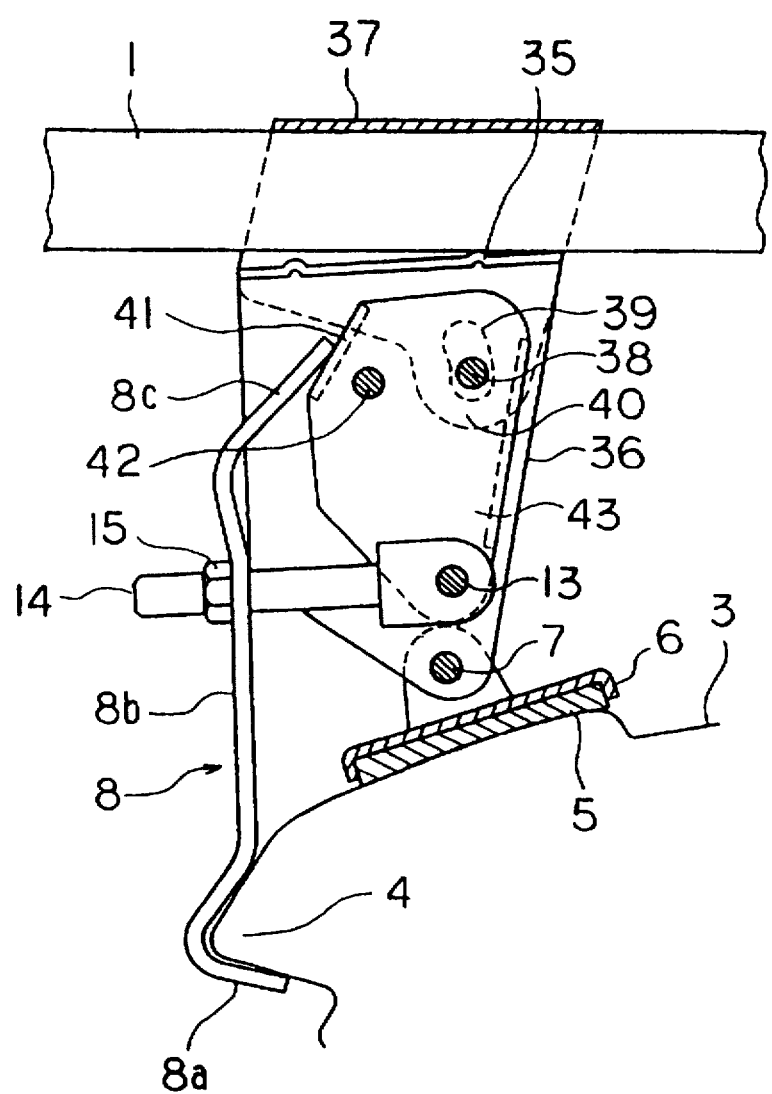
FIG. 27 is a vertical cross-sectional front view of the seventh embodiment of the apparatus for fixing a vehicle carrying platform according to this invention during an operation.

FIGS. 15 and 16 show a fifth embodiment. In this embodiment, without the use of the spring 20, as in the fourth embodiment, the inclined slide section 17 of the hook-holding member 18 is extended downward, and the bolt through-hole 29 into which the bolt 14 is inserted so that it can rotate is formed.

The fifth embodiment prevents the hook 8 from being removed from the hook-holding member 18 thereby loosening the fixation of the carrier bar 1 even when the bolt 14 and the nut 15 are loosened.

The other operations and advantages of the fifth embodiment are the same as those of the above embodiments.

FIGS. 17 to 21 show a sixth embodiment of this invention. This embodiment uses a stay, a hook, a bolt, and a nut similar to the stay 2, the hook 8, the bolt 14, and the nut 15, respectively, in the first and second embodiment. In this embodiment, a pressing section 30, the upper surface of which being connected to the lower surface of the carrier bar 1, is provided, and the intermediate portion of the pressing plate 31 is connected to the inner intermediate portion of the stay 2 via an arc-like long hole 32 with its center at the intermediate central pivotal point, using the pin 12. The outer upper part of the hook-holding member 34 rotatably connects to the intermediate center of the pressing plate 31 via a pivotal pin 33, and the lower part of the hook-holding member 34 and the intermediate portion 8b of the hook 8 are connected via a tightening member that includes the pivotal pin 13, the bolt 14, and the nut 15.

The inclined slide section 17 is formed outside the hook-holding member 34, and the upper inclined part 8c of the hook 8 slidably engages the inclined slide section 17 of the hook-holding member 34.

According to this sixth embodiment, the surface of the pressing section 30 of the pressing plate 31 can be constantly maintained parallel to the lower surface of the carrier bar 1 to constantly and uniformly press the carrier bar 1, thereby preventing excessive force from being applied thereto.

The other operations and advantages of the sixth embodiment are the same as those of the above embodiments.

FIGS. 22 to 27 show a seventh embodiment of this invention. The vehicle carrying platform fixing apparatus according to this embodiment comprises a stay 36 having on its upper surface a pressing section 35 that engages the lower surface of a carrier bar and the lower part of which is attached to the roof 3 of a vehicle via the pivotal pin 7; a hook 8 the lower bent part 8a of which is hooked to the corner 4 of the roof 3 of the vehicle; a pressing plate 40 that has on its upper surface a surface 37 that engages the upper surface of the carrier bar 1 and on its lower part a long hole 39 into which the pin 38 is inserted; a hook-holding member 43 having in its outer upper part an inclined free-sliding slide section 41 that engages the upper inclined part 8c of the hook 8, the upper part of which is connected to the lower part of the pressing plate 40 and the upper part of the stay 36 via the pin 38 and the pivotal pin 42, respectively, and the lower part of which is connected to the intermediate portion 8b of the hook 8 via a tightening member that includes the pivotal pin 13, the bolt 14, and the nut 15.

According to the seventh embodiment, when a lift is applied to the carrier bar 1, the pin 38 is pulled upward via the pressing plate 40. The hook-holding member 43 thus rotates counterclockwise around the pivotal pin 42, thereby controlling the upper inclined part 8c of the hook 8 so that it rotates counterclockwise around the bolt 14, which further presses the lower bent part 8a of the hook 8 against the corner 4 of the roof 3.

The other operations and advantages of the seventh embodiment are the same as those of the above embodiments.

Various known means such as levers can be used instead of the pivotal pin and the tightening member comprising a combination of bolt and nut, as used in the above embodiments.

In addition, the combination of a bolt and nut in the above embodiments may be inverted. For example, the nut 15 may be fixed to the mounting member 13a, to which the bolt 14 is spirally connected, thereby allowing the head of the bolt 14 to press the hook 8.

As described above, the apparatus for fixing a vehicle carrying platform is very advantageous in that a very simple constitution can be used to prevent the hook from being loosened by the astride phenomenon, which occurs when a load is applied to the carrier bar.

We claim:

1. An apparatus for fixing a vehicle carrying platform comprising a stay and pressing section connected to a vehicle for grasping a carrier bar, a hook hooked to the vehicle, and a hook-holding member coupled to said hook, characterized in that when said pressing section is shifted in a direction in which tightening force on said hook is decreased, said hook is controlled to increase said tightening force via said hook-holding member.

2. An apparatus for fixing a vehicle carrying platform, the apparatus comprising a stay having in its upper part a surface that engages an upper surface of a carrier bar and a lower part of which attaches to the vehicle; a hook a lower part of which is hooked to the vehicle; a pressing plate having on its upper surface a pressing section that engages a lower surface of the carrier bar, the upper part of which is connected to an intermediate portion of said stay via a pin and the lower part of which is connected to an intermediate portion of said hook via a tightening member; a hook-holding member having a free-sliding slide section that engages an upper part of said hook, the upper part of which is connected to the intermediate portion of said stay via said pin and the intermediate portion of which is rotatably connected to the intermediate portion of said pressing plate via a pivotal pin; and an elastic means for biasing the hook-holding member away from said pressing plate whereby when said pressing section is shifted in a direction in which tightening force on said hook is decreased, the tightening force on said hook is increased via said hook holding member.

3. An apparatus for fixing a vehicle carrying platform according to claim 2 wherein said elastic means comprises a spring wound around the pivotal pin to rotatably connect said hook-holding member to the intermediate portion of said pressing plate, one end which contacts said hook-holding member and the other end which contacts the lower part of said pressing plate.

4. An apparatus for fixing a vehicle carrying platform, the apparatus comprising a stay having in its upper part a surface engaging an upper surface of a carrier bar and its lower part attached to the vehicle; a hook a lower part of which is hooked to the vehicle; a pressing plate having on its hook-side upper surface a pressing section engaging a lower surface of the carrier bar, an upper part of which is rotatably connected to an intermediate portion of said stay via a pivotal pin and a lower part of which is connected to an intermediate portion of said hook via a tightening member; a hook-holding member having on the hook side a free-sliding slide section that engages an upper part of said hook and is connected to the intermediate portion of said hook and the upper part of said pressing plate via said pivotal pin; and an elastic means for billing the hook-holding member away from said pressing plate.

5. An apparatus for fixing a vehicle carrying platform according to claim 4 wherein said hook-holding member has a pressing section on its upper surface opposite said hook and that said elastic means comprises a spring wound around the pivotal pin to rotatably connect said hook-holding member to the intermediate portion of said pressing plate, one end of which contacts the pressing section of said pressing plate, while the other end contacts the pressing section of said hook-holding member.

6. An apparatus for fixing a vehicle carrying platform according to claim 2, 3, 4, or 5 further comprising a self-locking member for detachably locking the lower part of said pressing plate to said stay.

7. An apparatus for fixing a vehicle carrying platform, the apparatus comprising a stay having in its upper part a surface that engages an upper surface of a carrier bar and a lower part of which is attached to the vehicle; a hook a lower part of which is hooked to the vehicle and an intermediate portion that is connected to the lower portion of said stay via a tightening member; a hook-holding member having on its upper surface opposite said hook pressing section that engages a lower surface of the carrier bar, having on a hook side a free-sliding slide section that engages an upper part of said hook, and rotatably connects to the intermediate portion of said stay; and an elastic means for biasing the hook-holding member away from said pressing plate.

8. An apparatus for fixing a vehicle carrying platform according to claim 6 wherein said elastic means comprises a spring wound around a pivotal pin to rotatably connect said hook-holding member to said stay, one end of which contacts the opposite side of said hook of said stay while the other end contacts the pressing section of said hook-holding member.

9. An apparatus for fixing a vehicle carrying platform, the apparatus comprising a stay having in its upper part a surface that engages an upper surface of a carrier bar and a lower part of which is attached to the vehicle; a hook a lower part of which is hooked to the vehicle and an intermediate portion that is connected to the lower part of said stay via a tightening member; a hook-holding member having on its upper surface opposite said hook a pressing section that engages the lower surface of the carrier bar, having on a hook side a slide section that engages an upper part of said hook, and rotatably connects to the upper part of said stay; and a means provided below the hook-holding member for holding said tightening member.

10. An apparatus for fixing a vehicle carrying platform, the apparatus comprising a stay having in its upper part a surface that engages an upper surface of a carrier bar and a lower part of which is attached to the vehicle; a hook a lower part of which is hooked to the vehicle; a pressing plate having on its upper surface a pressing section that engages a lower surface of the carrier bar and rotatably connects to an intermediate portion of said stay via a pivotal pin; a hook-holding member having a free-sliding slide section that engages the upper part of said hook, an upper part of which rotatably connects to said pressing plate via a pivotal pin and the lower part of which is connected to the intermediate portion of said hook via a tightening member.

11. An apparatus for fixing a vehicle carrying platform, the apparatus comprising a stay having in its upper part a pressing section that engages a lower surface of a carrier bar and a lower part of which is attached to the vehicle; a hook a lower part of which is hooked to the vehicle; a pressing plate having on its upper surface a surface that engages an upper surface of the carrier bar and a lower part of which connects to the upper part of said stay via a pin; a hook-holding member having in its upper part a free-sliding slide section that engages an upper part of said hook, an upper part of which is connected to the lower part of said pressing plate and the upper part of said stay via said pin and a pivotal pin, respectively, and a lower part of which is connected to an intermediate portion of said hook via a tightening member.

* * * * *